United States Patent
Wang et al.

(10) Patent No.: US 9,090,306 B2
(45) Date of Patent: Jul. 28, 2015

(54) FOLDING HANDLEBAR MECHANISM AND FOLDING VEHICLE HAVING SAME

(71) Applicant: Yao-Chin Wang, Taichung (TW)

(72) Inventors: Yao-Chin Wang, Taichung (TW);
Chao-Huei Wang, Taichung (TW);
Shuo-Feng Wang, Taichung (TW);
Chih-Teng Liao, Taichung (TW)

(73) Assignee: Yao-Chin Wang, Taichung (TW)

( * ) Notice: Subject to any disclaimer, the term of this patent is extended or adjusted under 35 U.S.C. 154(b) by 320 days.

(21) Appl. No.: 13/726,758

(22) Filed: Dec. 26, 2012

(65) Prior Publication Data

US 2013/0167684 A1    Jul. 4, 2013

(30) Foreign Application Priority Data

Jan. 4, 2012   (TW) .............................. 101200154 U
Aug. 29, 2012  (TW) .............................. 101216624 U

(51) Int. Cl.
*B62K 21/16*   (2006.01)
*B62K 21/12*   (2006.01)
*B62K 15/00*   (2006.01)

(52) U.S. Cl.
CPC ............... *B62K 21/12* (2013.01); *B62K 15/008* (2013.01); *Y10T 74/20798* (2015.01)

(58) Field of Classification Search
CPC ........ B62K 21/16; B62K 21/26; B62K 21/22; B62K 21/12; B62K 15/008; Y10T 74/20798; Y10T 74/20792; Y10T 74/2078; Y10T 74/20804
USPC ............ 74/551.1–551.7, 547; 280/87.05, 278
See application file for complete search history.

(56) References Cited

U.S. PATENT DOCUMENTS

| 4,417,745 A | * | 11/1983 | Shomo | 280/287 |
| 6,301,749 B1 | * | 10/2001 | Chen | 16/429 |
| 2004/0187627 A1 | * | 9/2004 | Bass et al. | 74/551.3 |

FOREIGN PATENT DOCUMENTS

DE   202007017133 U1   2/2008

* cited by examiner

*Primary Examiner* — Marcus Charles
*Assistant Examiner* — Yamilka Pinero Medina
(74) *Attorney, Agent, or Firm* — Alan D. Kamrath; Kamrath IP Lawfirm, P.A.

(57) ABSTRACT

A folding handlebar mechanism includes a steering tube, a stem assembly mounted on the steering tube, two handlebars rotatably and slidably mounted into two distal ends of the stem assembly, a repressed member abutted against the stem assembly, and a positioning assembly. The positioning assembly is operable between a tighten mode and a loose mode to cause the two handlebars to be selectively rotatable and slidable with respect to the two opposite ends of the stem assembly.

14 Claims, 15 Drawing Sheets

FOLDING HANDLEBAR MECHANISM AND FOLDING VEHICLE HAVING SAME

BACKGROUND OF THE INVENTION

1. Field of the Invention

The present invention relates to a handlebar for a vehicle and, more particularly, to a folding handlebar mechanism mounted on a folding vehicle to fold into a compact form.

2. Description of the Related Art

In order to facilitate transport and storage, the current trend is to build a folding vehicle such as a folding bike. When folded, the vehicles can be more easily carried into buildings and workplaces or on public transportation, and can be more easily stored in compact living quarters or aboard a car, boat or plane. Thus, various folding mechanisms have been designed on the vehicle, among which folding, unfolding and locking mechanisms are the most commonly used.

A conventional folding bike includes a hinged frame, a height adjustable seat post, and a quick release handlebar stem allowing the bars to pivot parallel to the frame to abut the bars against wheels when folded. However, the handlebar stem and the bars are substantively formed in a T-shape and cannot pivot with each other, so that the conventional folding bike can not be folded into a compact form and occupies too much space.

Thus, a need exists for a novel folding handlebar assembly that mitigates and/or obviates the above disadvantages.

SUMMARY OF THE INVENTION

The present invention solves this need and other problems in the field of a folding handlebar mechanism including a steering tube, a stem assembly mounted on the steering tube, two handlebars rotatably and slidably mounted into two distal ends of the stem assembly, a repressed member abutted against the stem assembly, and a positioning assembly. The positioning assembly includes a rod, a lever pivotally connecting to one end of the rod, and a gasket attached with the repressed member. The positioning assembly is operable between a tighten mode and a loose mode to cause the two handlebars to be selectively rotatable and slidable with respect to the two opposite ends of the stem assembly.

Preferably, the stem assembly includes an outer sleeve, and an inner sleeve mounted into the outer sleeve. The outer sleeve includes two first gaps respectively formed at two distal ends thereof. The inner sleeve includes two second gaps respectively formed at two distal ends thereof and corresponding to the first gaps of the outer sleeve.

Preferably, the inner sleeve includes two bilateral first guiding slots, and two bilateral second guiding slots faced and arranged opposite to the two first guiding slots.

Each of the two handlebars includes an engaging portion, and a gripping portion formed at two opposite ends thereof. Each of the two engaging portions is rotatably and slidably mounted into the distal end of the stem assembly and has a guiding hole.

Two guiding pins each insert through each of the two first guiding slots, each of the two guiding holes and each of the two second guiding slots to cause the two handlebars to be rotatably and slidably received into the two distal ends of the stem assembly.

Each of the two first guiding slots includes a first arc section, and a first straight section connected to the first arc section. Each of the two first arc sections is radially extended from a top section to a side section of the inner sleeve in a circumferential direction. Each of the two first straight sections is connected to one end of the first arc section disposed at the side section of the inner sleeve and straight extended to the distal end of the side section of the inner sleeve.

Each of the two second guiding slots includes a second arc section, and a second straight section connected to the second arc section. Each of the two second arc sections is radially extended from a bottom section of the inner sleeve to the other side section of the inner sleeve in a circumferential direction. Each of the two second straight sections is connected to one end of the second arc section disposed at the side section of the inner sleeve and straight extended to the distal end of the inner sleeve.

In an example, the inner sleeve includes a through hole receiving the repressed member.

In another example, the stem assembly includes two first linked portions respectively formed at two side sections thereof, and two fastening portions respectively extended downward from the bottom section of the two distal ends thereof and able to engage with the two handlebars. The repressed member includes two second linked portions respectively formed at two side sections thereof and corresponding to the two first linked portions of the outer sleeve.

An advantage of the folding handlebar mechanism according to the present invention is that the two handlebars are rotatably and slidably mounted at two opposite ends of the stem assembly to cause the folding handlebar mechanism to be operable between an operative mode and a folding mode.

Another advantage of the folding handlebar mechanism according to the present invention is that the positioning assembly is operable in a tighten mode and a loose mode to cause the two handlebars to be securely mounted to the stem assembly or to be rotatable and slidable with respect to the two opposite ends of the stem assembly. Thus, the folding handlebar mechanism is operable between an operative mode and a folding mode simply and quickly.

A further advantage of the folding handlebar mechanism according to the present invention is that the folding handlebar mechanism mounted on the folding vehicle and disposed in the folding mode is able to drastically reduce a distance defined between the two wheels of the folding vehicle to cause the folding vehicle to be folded into a more compact form.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
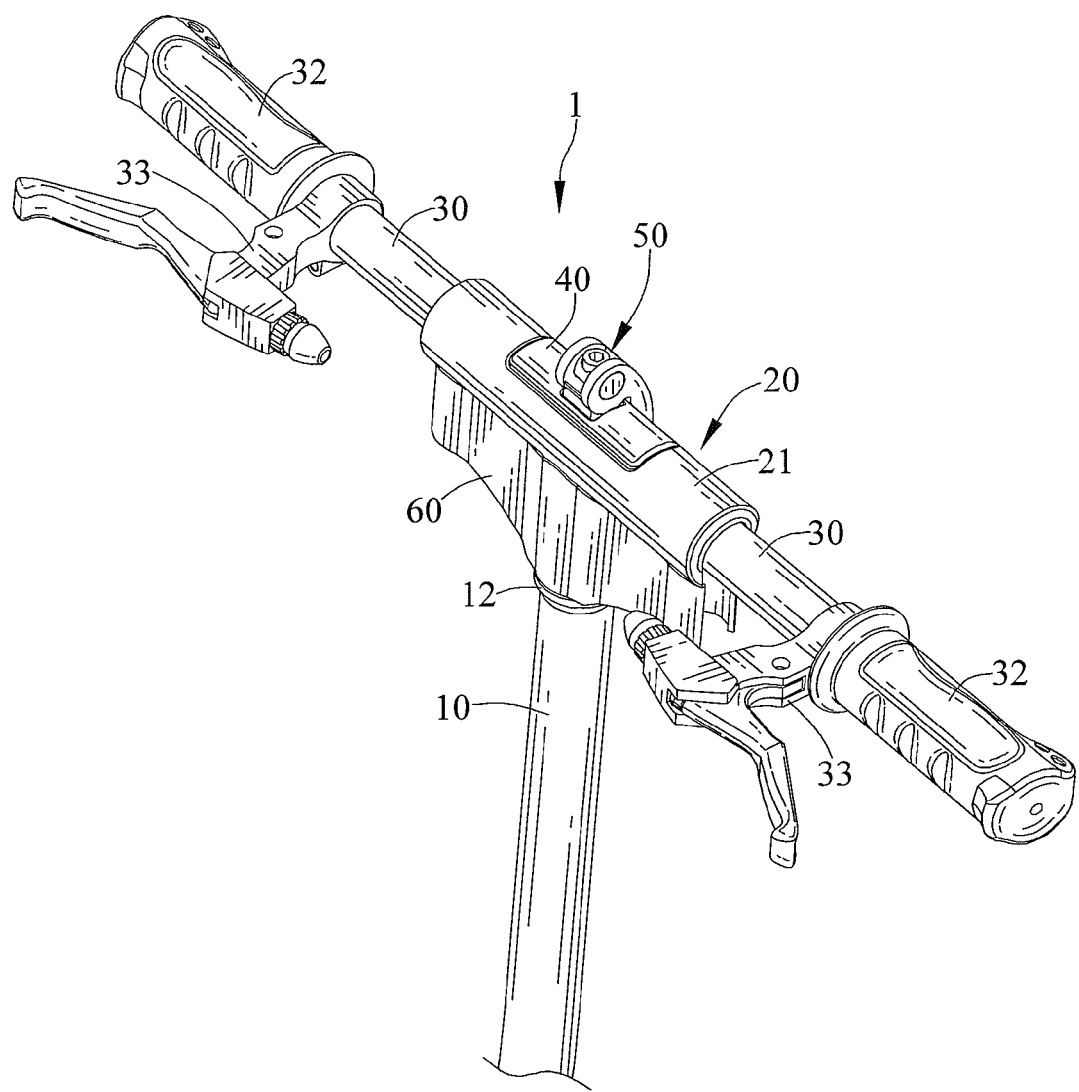
FIG. 1 shows a perspective view of a folding handlebar mechanism of a first embodiment according to the present invention, and illustrates the folding handlebar mechanism in an operative mode.
Figure 2:
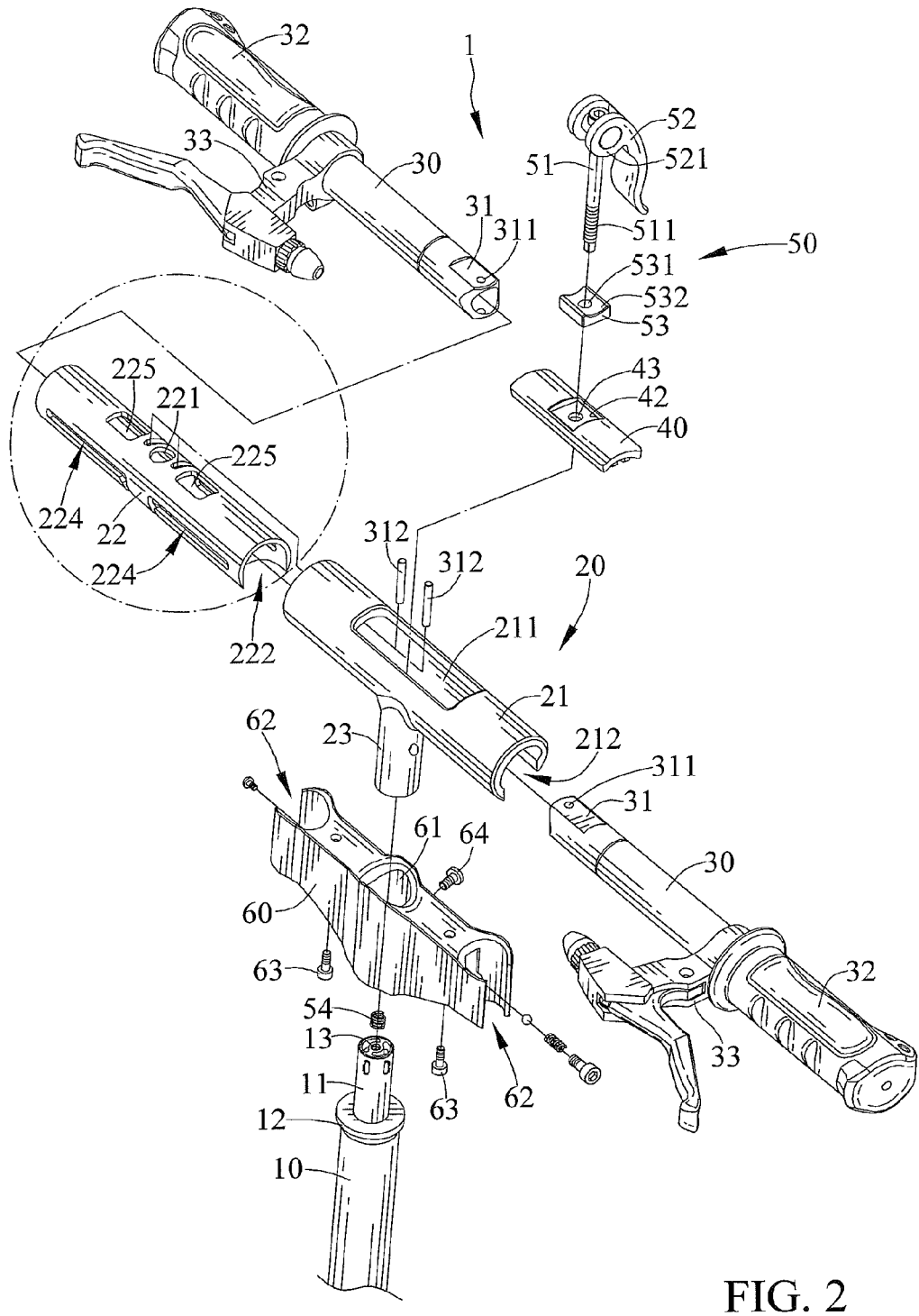
FIG. 2 shows an exploded, perspective view of the folding handlebar mechanism of FIG. 1.
Figure 3:
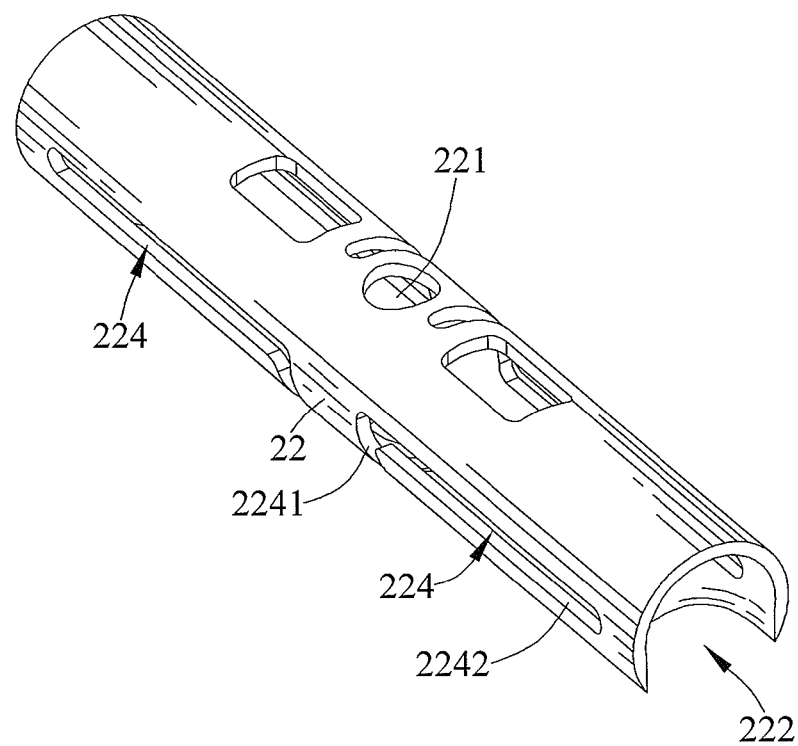
FIG. 3 shows a partial, enlarged perspective view of the folding handlebar mechanism of FIG. 2.
Figure 4:
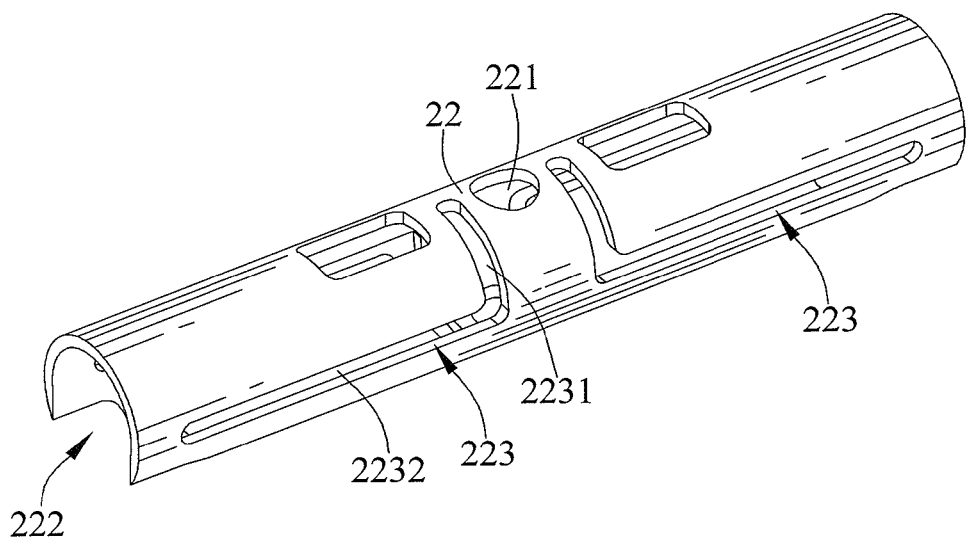
FIG. 4 is a partial, enlarged perspective view of the folding handlebar mechanism taken from a different angle than that of FIG. 3.
Figure 5:
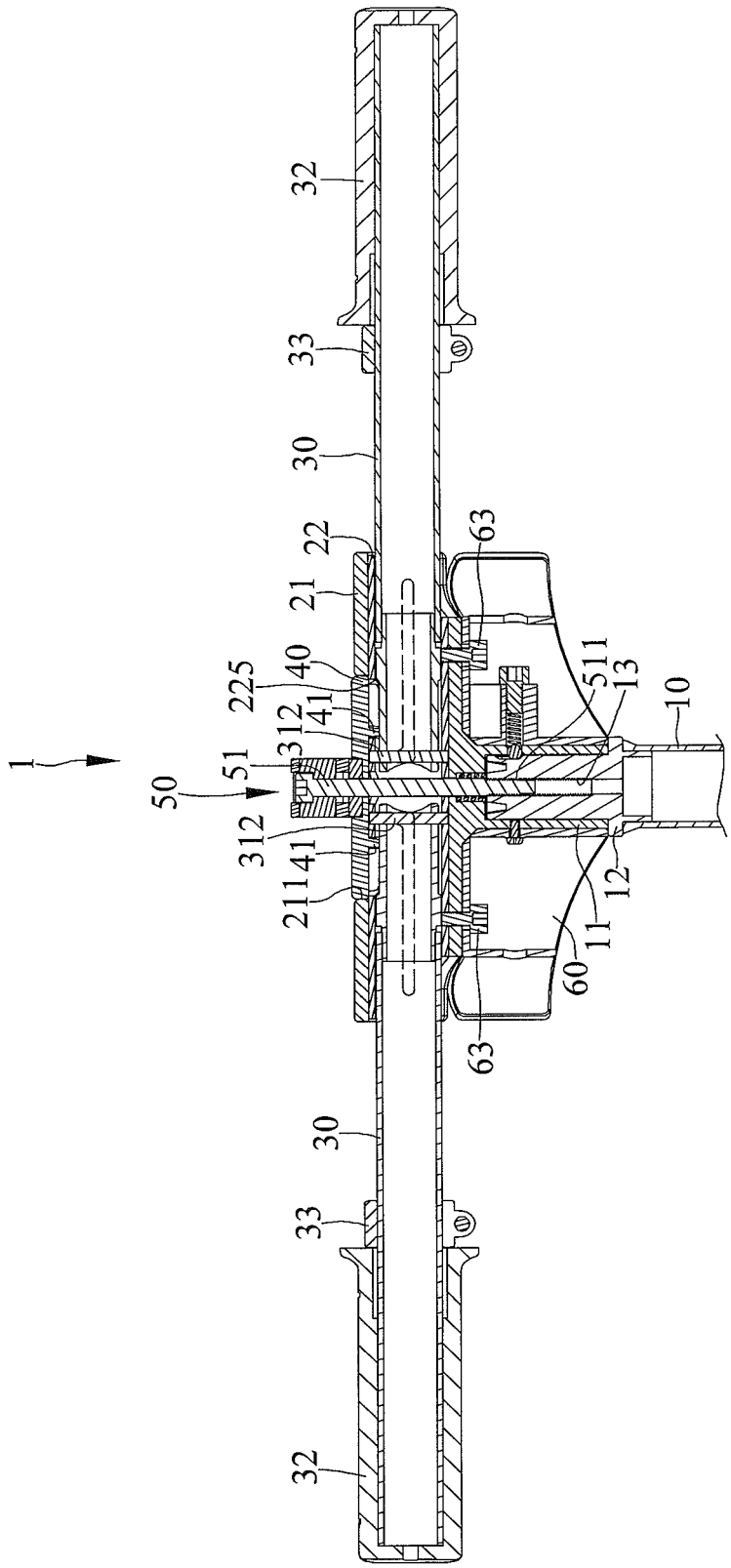
FIG. 5 shows a cross-section view of the folding handlebar mechanism of FIG. 1.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE PREFERRED EMBODIMENTS

FIGS. 1 through 6 show a first embodiment of a folding handlebar mechanism according to the present invention. The folding handlebar mechanism 1 includes a steering tube 10, a stem assembly 20 mounted on the steering tube 10, two handlebars 30 rotatably and slidably mounted at two opposite ends of the stem assembly 20, a repressed member 40 abutted against the stem assembly 20, a positioning assembly 50 abutted against repressed member 40, and a bar holder 60 mounted between the steering tube 10 and the stem assembly 20.

The steering tube 10 is upright and delimited by a larger diameter section and a smaller diameter section. The smaller diameter section of the steering tube 10 is formed by a shrinking portion 11. A shoulder portion 12 is formed between the larger and smaller diameter sections and has the largest diameter in the steering tube 10. A thread hole 13 is formed through the shrinking portion 11.

The stem assembly 20 includes an outer sleeve 21, an inner sleeve 22 mounted into the outer sleeve 21, and an extended tube 23 extending downward from a middle part of a bottom section of the outer sleeve 21. The outer sleeve 21 includes a content hole 211 formed on a top section arranged opposite to the bottom section thereof, and two first gaps 212 respectively formed at two distal ends thereof and extended toward the middle part of the bottom section thereof. The content hole 211 is formed in a rectangular shape. The inner sleeve 22 is substantively formed in a tube and includes a through hole 221 extended from a top section to a bottom section thereof and connected with the content hole 211, two second gaps 222 respectively formed at two distal ends thereof and corresponding to the first gaps 212 of the outer sleeve 21, two bilateral first guiding slots 223, and two bilateral second guiding slots 224 faced and arranged opposite to the two first guiding slots 223 each formed in a L-shape. Each of the two first guiding slots 223 includes a first arc section 2231, and a first straight section 2232 connected to the first arc section 2231. Each of the two first arc sections 2231 is radially extended from the top section adjacent to the through hole 221 to a side section of the inner sleeve 22 in a circumferential direction. Each of the two first straight sections 2232 is connected to one end of the first arc section 2231 disposed at the side section of the inner sleeve 22 and straight extended to the distal end of the side section of the inner sleeve 22. Each of the two second guiding slots 224 includes a second arc section 2241, and a second straight section 2242 connected to the second arc section 2241. Each of the two second arc sections 2241 is radially extended from the bottom section of the inner sleeve 22 to the other side section of the inner sleeve 22 in a circumferential direction. Each of the two second straight sections 2242 is connected to one end of the second arc section 2241 disposed at the side section of the inner sleeve 22 and straight extended to the distal end of the inner sleeve 22. In a preferred form, each of the two first arc sections 2231 is extended in correspondence with each of the two second arc sections 2241, and each of the two first straight sections 2232 is extended parallel to each of the two second straight sections 2242. The inner sleeve 22 further includes two inserting recesses 225 symmetrically formed adjacent two sides of the through hole 221. The extended tube 23 is substantially hollow and extended downward from the middle part of the bottom section of the outer sleeve 21. A terminal end of the extended tube 23 disposed opposite to the inner sleeve 22 inserts through the bar holder 60. Thus, the terminal end of the extended tube 23 is engaged with the shrinking portion 11 and abutted against the shoulder portion 12 of the steering tube 10.

Each of the two handlebars 30 includes an engaging portion 31, and a gripping portion 32 formed at two opposite ends thereof. Each of the two engaging portions 31 is rotatably and slidably mounted into the distal end of the stem assembly 20 and has a guiding hole 311. Two guiding pins 312 each insert through each of the two first guiding slots 223, each of the two guiding holes 311 and each of the two second guiding slots 224 to cause the two handlebars 30 to be rotatably and slidably received into the two distal ends of the stem assembly 20. Each of the two gripping portions 32 can be gripped by a rider.

Two brake levers 33 are mounted between the engaging portion 31 and the gripping portion 32 of each of the two handlebars 30.

The repressed member 40 is received in the content hole 211 of the outer sleeve 21 and abutted against the inner sleeve 22 of the stem assembly 20. The repressed member 40 includes two convex portions 41 extended from a bottom surface thereof and engaging in the two inserting recesses 225 of the inner sleeve 22, a rectangular engaging groove 42 formed at a top surface thereof, and a bore 43 penetrating through the top and bottom surfaces thereof.

The positioning assembly 50 is operable between a tighten mode and a loose mode and includes a rod 51 threaded on one end to form a thread portion 511, a lever 52 pivotally connecting to the other end of the rod 51, and a rectangular gasket 53 received in the engaging groove 42 of the repressed member 40 and abutted against the lever 52. Specifically, the positioning assembly 50 can be a quick release skewer. The rod 51 inserts through an aperture 531 of the gasket 53, the bore 43 of the repressed member 40, the content hole 211 of the outer sleeve 21, the through hole 221 of the inner sleeve 22, the extended tube 23, and a spring 54. Moreover, the thread portion 511 of the rod 51 is engaged within the thread hole 13 of the steering tube 10. The lever 52 includes a cam portion 521 pivotally connecting with the other end opposite to the thread portion 511 of the rod 51. When the positioning assembly 50 is in the tighten mode, the cam portion 521 of the lever 52 attaches with an oppression portion 532 of the gasket 53 resulting in the gasket 53 pressing against the repressed member 40 to secure the repressed member 40 to the stem assembly 20 to cause the two handlebars 30 to be securely mounted at the two opposite ends of the stem assembly 20, and the spring 54 is pressed. When the positioning assembly 50 is in the loose mode, the cam portion 521 of the lever 52 detaches from the oppression portion 532 of the gasket 53 to cause the two handlebars 30 to be rotatable and slidable with respect to the two opposite ends of the stem assembly 20, and the spring 54 is released.

The bar holder 60 is mounted between the steering tube 10 and the stem assembly 20 and includes a vertical hole 61, and two fastening portions 62 formed at two opposite ends thereof. The bar holder 60 is mounted to the outer sleeve 21 of the stem assembly 20 by two fasteners 63, and the vertical hole 61 is inserted by the extended tube 23 of the stem assembly 20. Each of the two fastening portion 62 is generally formed in a C-shaped tube to enable selectively engaging with each of the two handlebars 30. A fixing member 64 inserts through a side section of the bar holder 60 and the shrinking portion 11 of the steering tube 10 to abut against the thread portion 511 of the rod 51 of the positioning assembly 50. In this embodiment, the two fasteners 63 and the fixing member 64 are screws.

The folding handlebar mechanism 1 is operable between an operative mode and a folding mode. When the folding handlebar mechanism 1 is in the operative mode (shown in FIGS. 1, 5 and 6), simultaneously the positioning assembly 50 is in the tighten mode. The cam portion 521 of the lever 52 attaches with the oppression portion 532 of the gasket 53, and the lever 52 abuts against the outer sleeve 21 to press the repressed member 40 against the inner sleeve 22. Each of the two guiding pins 312 is disposed in the first arc section 2231 of each of the two first guiding slots 223 and the second arc section 2241 of each of the two second guiding slots 224. The two guiding pins 312 are parallel to the rod 51. Therefore, each of two brake levers 33 and the steering tube 10 are formed in a vertical configuration.

Figure 9:
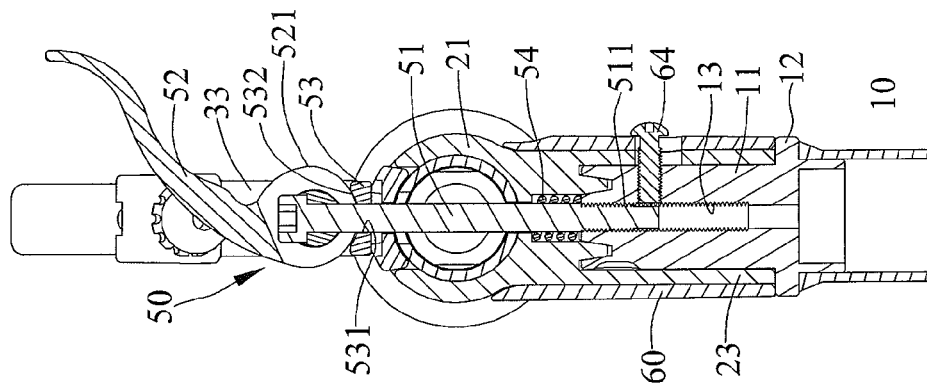
FIG. 9 shows another cross-section view of the folding handlebar mechanism of FIG. 7.
Figure 6:
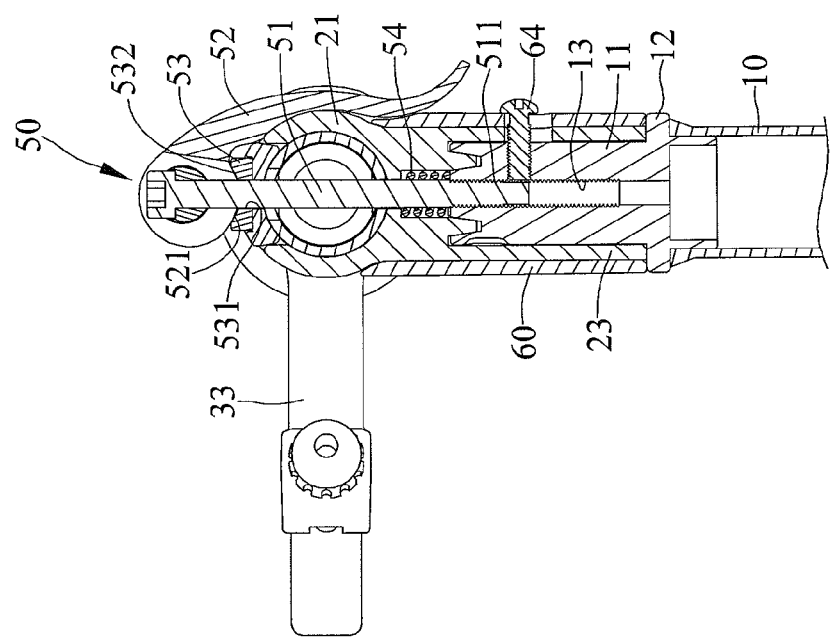
FIG. 6 shows another cross-section view of the folding handlebar mechanism of FIG. 1.
Figure 7:
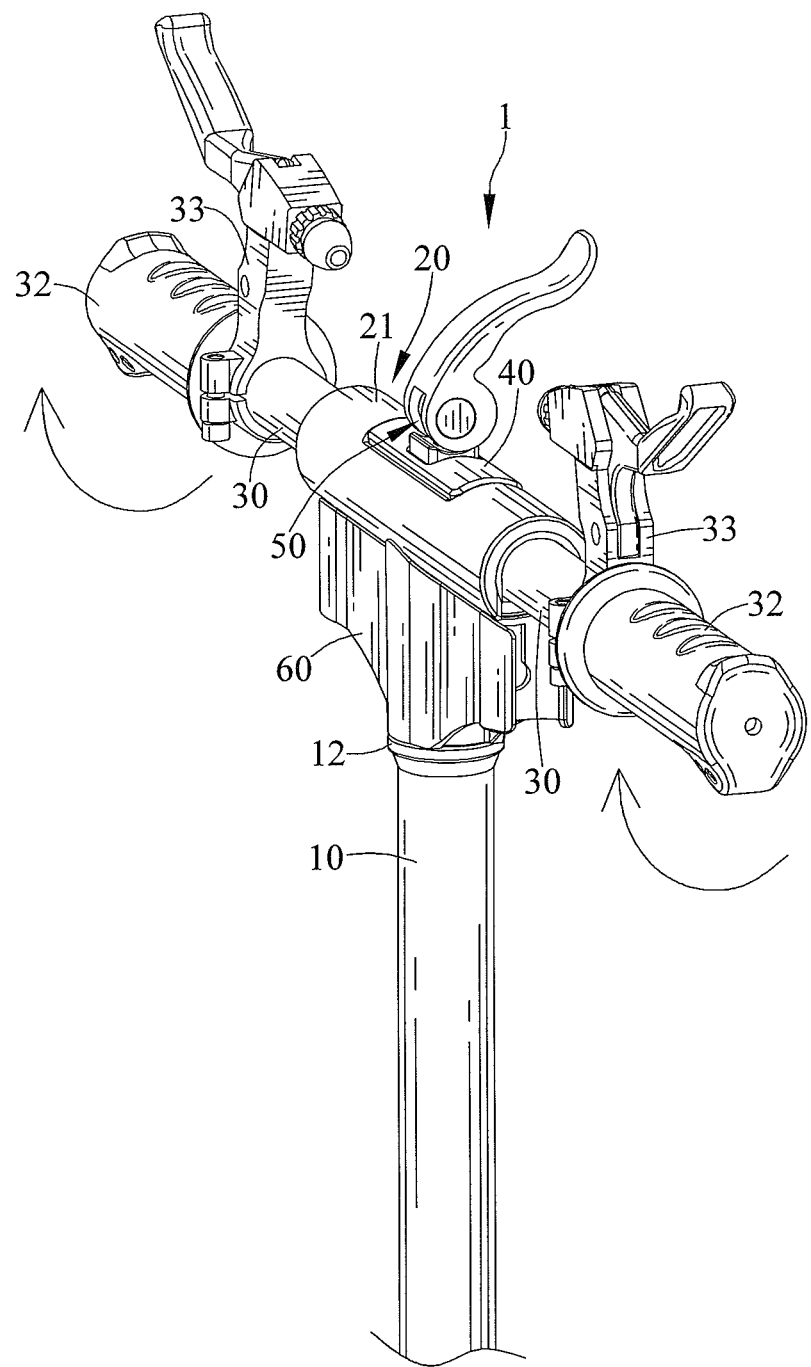
FIG. 7 shows a perspective view of a folding handlebar mechanism of a first embodiment according to the present invention, and illustrates a positioning assembly in a loose mode, and two handlebars pivoted with respect to an inner sleeve.
Figure 8:
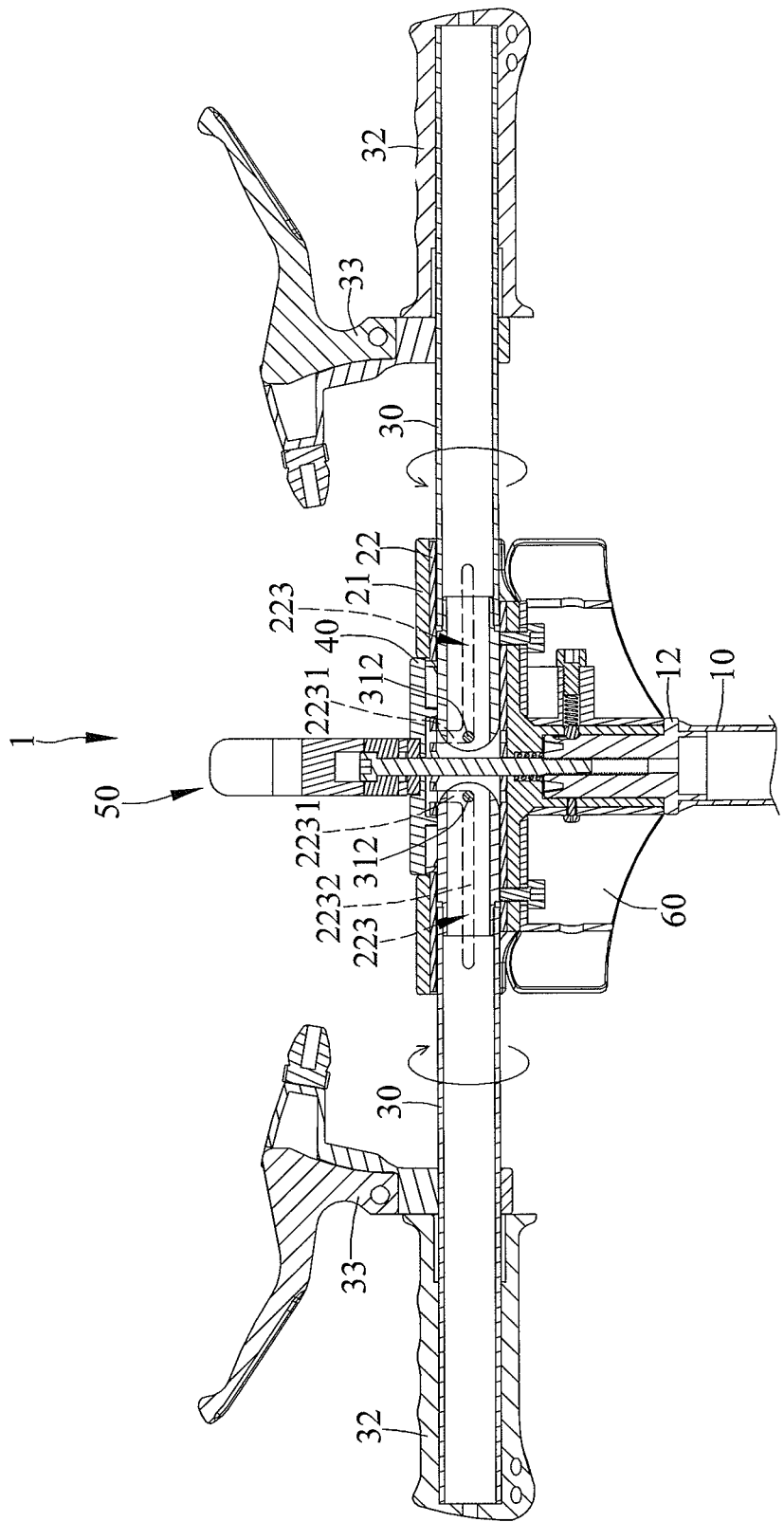
FIG. 8 shows a cross-section view of the folding handlebar mechanism of FIG. 7.

FIGS. 7 through 9 show the lever 52 pivoted with respect to the rod 51 to cause the positioning assembly 50 to be operated from the tighten mode to the loose mode. The spring 54 is released to detach the cam portion 521 of the lever 52 from the oppression portion 532 of the gasket 53, and the lever 52 is separated from the outer sleeve 21. The repressed member 40 is spaced with the inner sleeve 22. Therefore, each of the two handlebars 30 is pivoted 90 degrees with respect to the inner sleeve 22 in a clockwise direction to move each of the two guiding pins 312 from the first arc section 2231 of each of the two first guiding slots 223 and the second arc section 2241 of each of the two second guiding slots 224 to the first straight section 2232 of each of the two first guiding slots 223 and the second straight section 2242 of each of the two second guiding slots 224. Therefore, each of two brake levers 33 and the steering tube 10 are formed in a parallel configuration.

Figure 10:
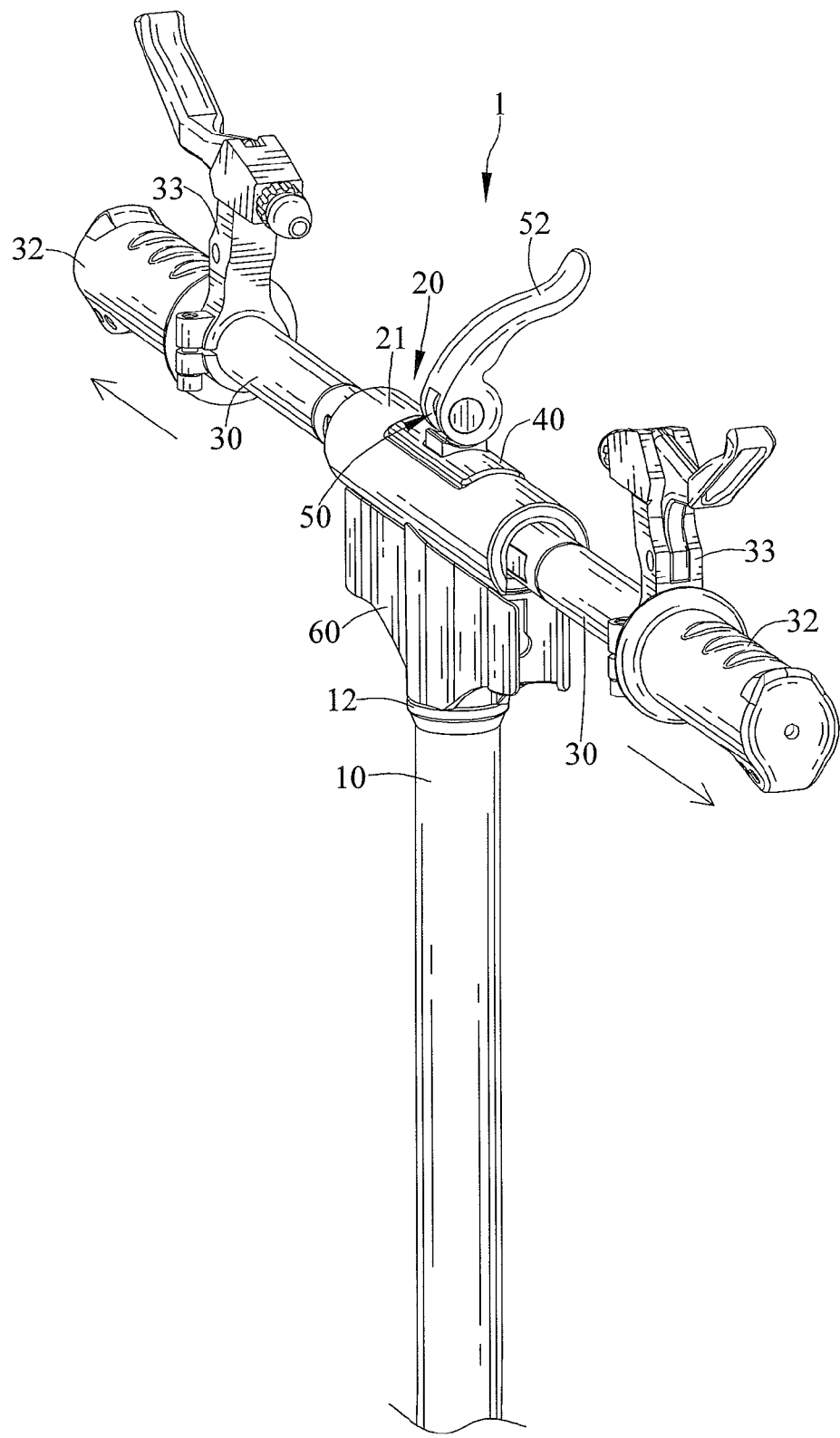
FIG. 10 shows a perspective view of a folding handlebar mechanism of a first embodiment according to the present invention, and illustrates the positioning assembly in a loose mode, and two handlebars pulled outward and sliding with respect to the inner sleeve.
Figure 11:
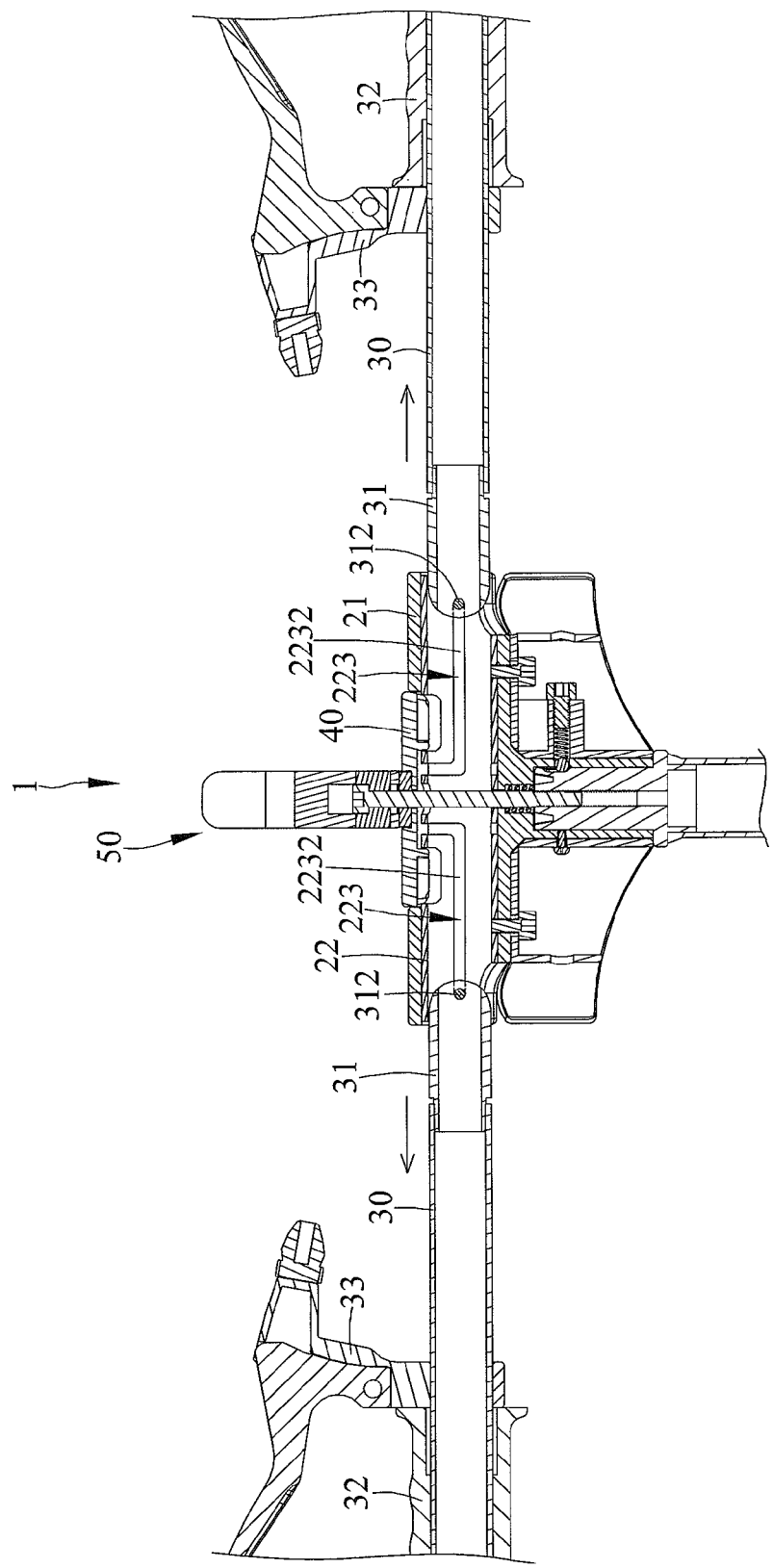
FIG. 11 shows a cross-section view of the folding handlebar mechanism of FIG. 10.

FIGS. 10 and 11 show each of the two handlebars 30 pulled outward and sliding with respect to the inner sleeve 22 to cause each of the two guiding pins 312 to be moved from one end of the first straight section 2232 adjacent to the first arc section 2231 of each of the two first guiding slots 223 and one end of the second straight section 2242 adjacent to the second arc section 2241 of each of the two second guiding slots 224 to the other end of the first straight section 2232 adjacent to the second gap 222 of each of the two first guiding slots 223 and the other end of the second straight section 2242 adjacent to the second gap 222 of each of the two second guiding slots 224. Each of the two engaging portions 31 exposes from each of the two distal ends of the inner sleeve 22.

Figure 12:
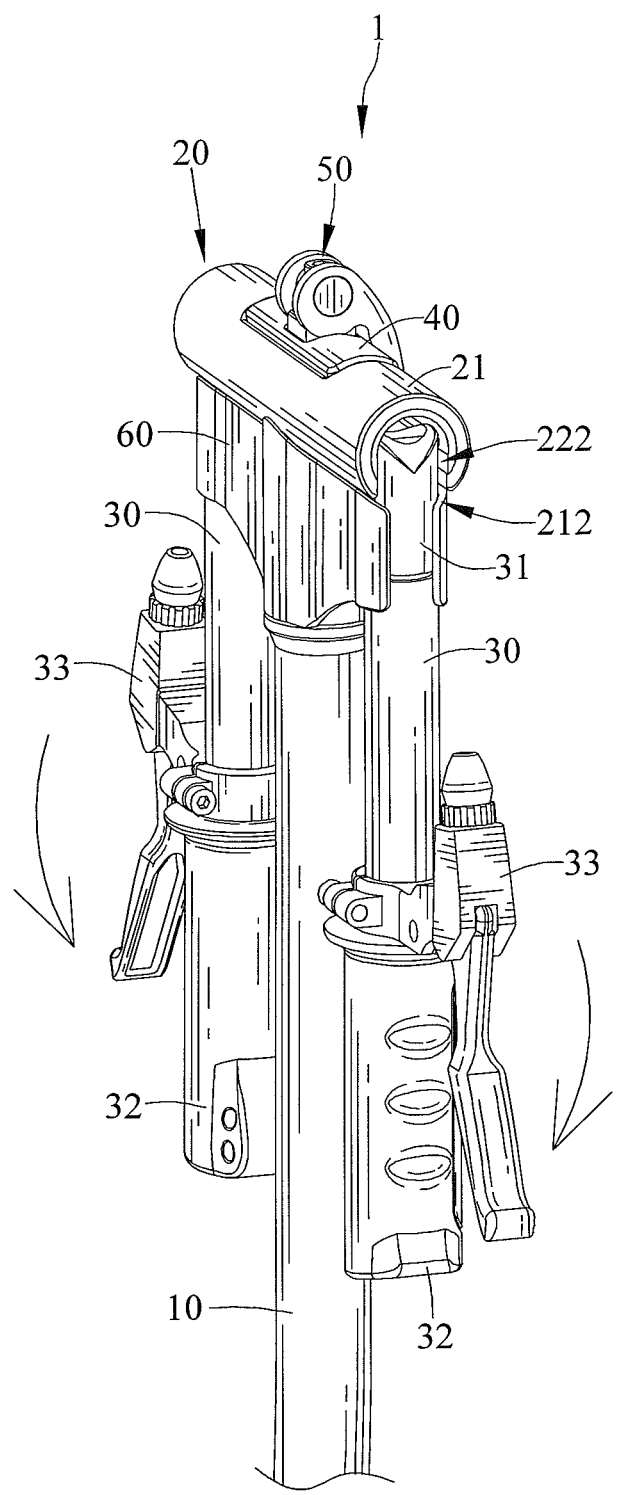
FIG. 12 shows a perspective view of a folding handlebar mechanism of a first embodiment according to the present invention, and illustrates the folding handlebar mechanism in a folding mode.
Figure 13:
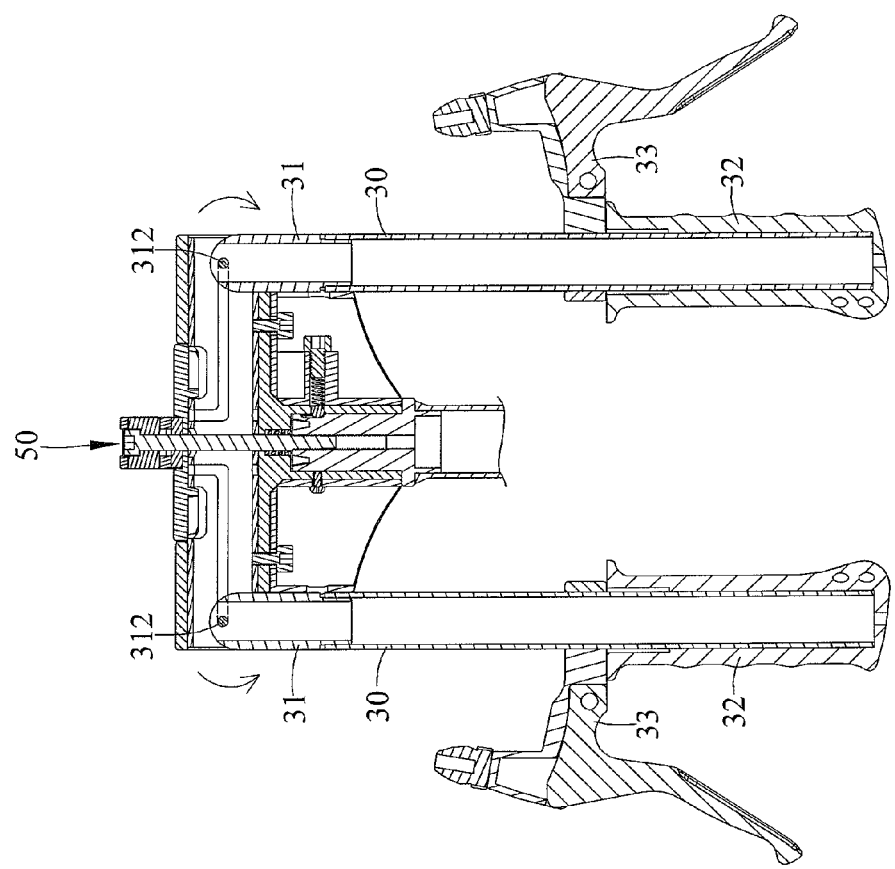
FIG. 13 shows a cross-section view of the folding handlebar mechanism of FIG. 12.

FIGS. 12 and 13 show the folding handlebar mechanism 1 in the folding mode. Each of the two handlebars 30 is pivoted with respect to each of the two guiding pins 312. Thus, each of the two handlebars 30 is received into each of the two first gaps 212 of the outer sleeve 21 and each of the two second gaps 222 of the inner sleeve 22. Therefore, each of the two handlebars 30 is parallel to the steering tube 10 and engaged with each of the two fastening portion 62 of the bar holder 60. Each of two brake levers 33 and the steering tube 10 are formed in a parallel configuration. Additionally, the positioning assembly 50 is in the tighten mode to cause that each of the two handlebars 30 cannot pivot with respect to each of the two guiding pins 312.

Figure 14:
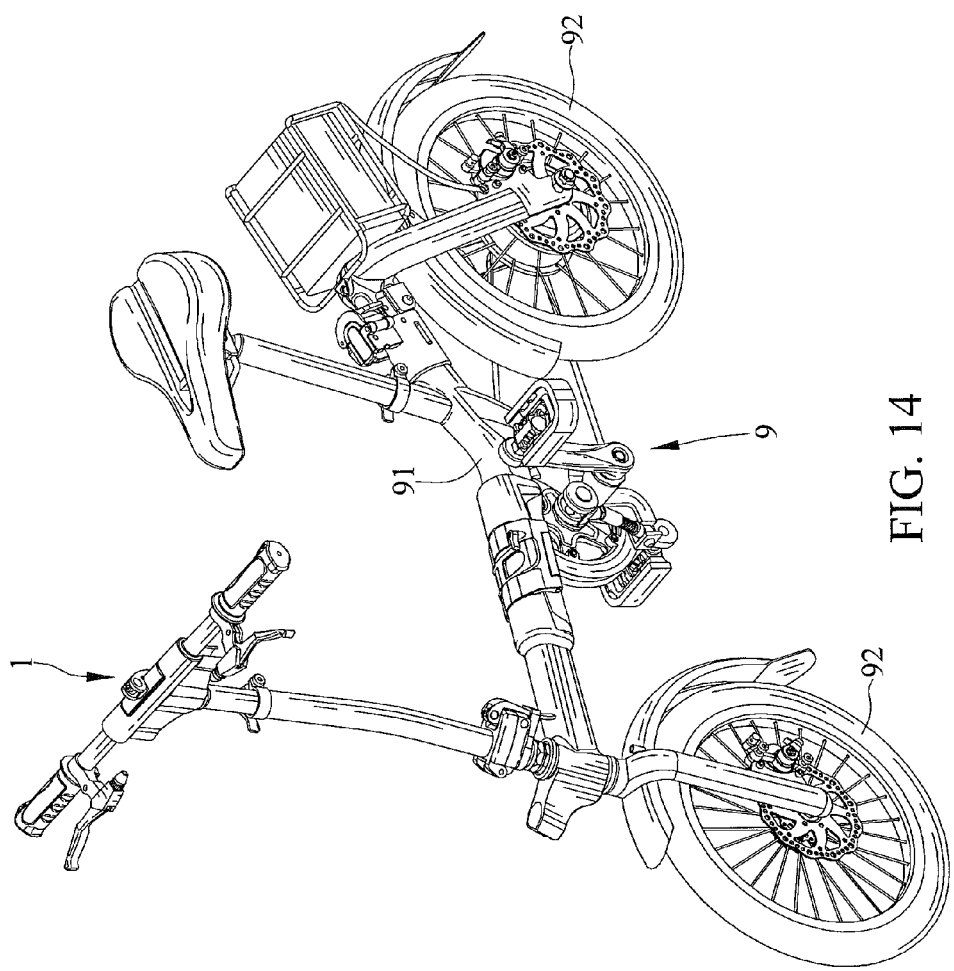
FIG. 14 shows a perspective view of a folding handlebar mechanism of a first embodiment according to the present invention, and illustrates the folding handlebar mechanism mounted on a folding vehicle.
Figure 15:
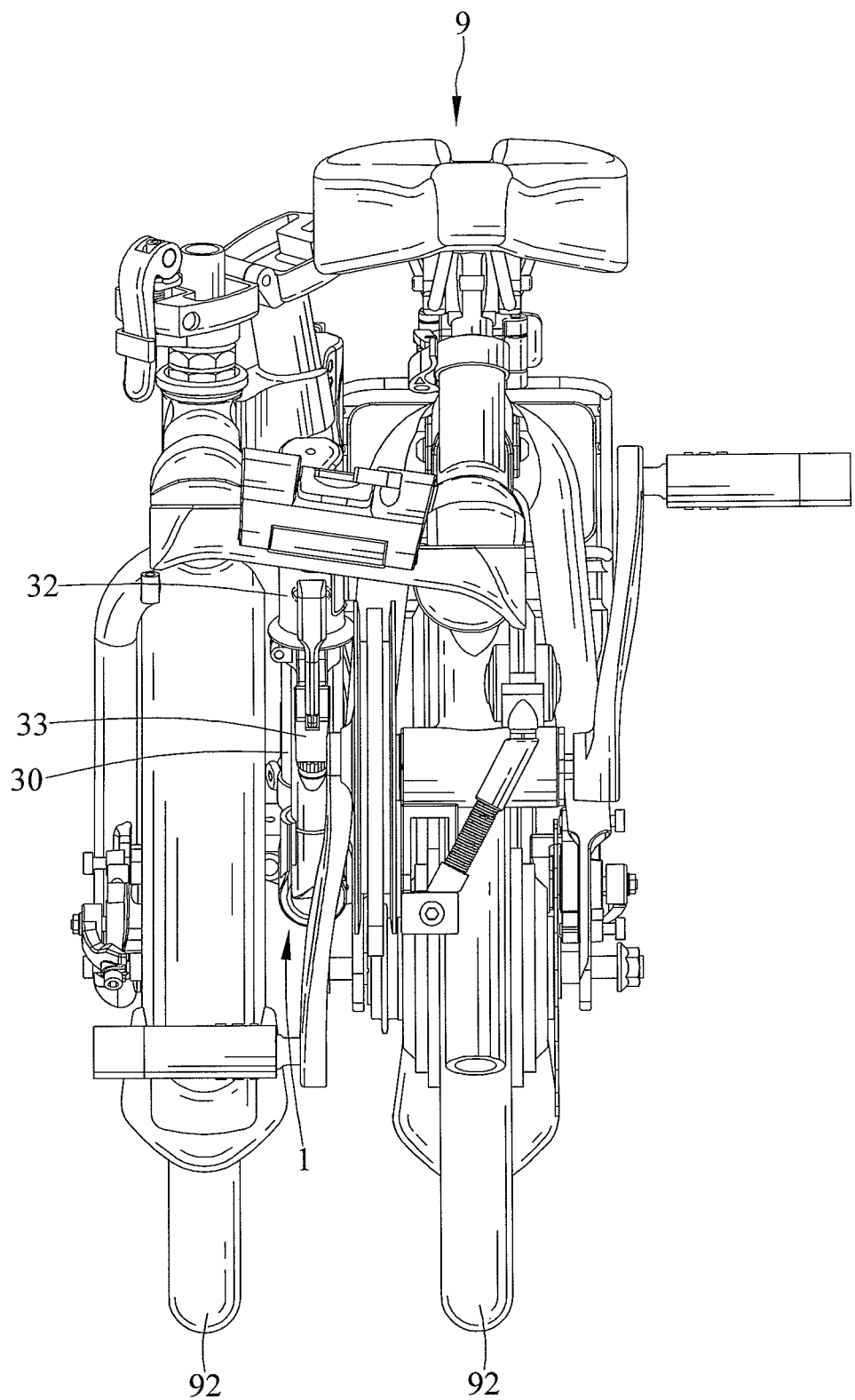
FIG. 15 shows a side view of the folding handlebar mechanism of FIG. 14, and illustrates the folding vehicle being folded, and the folding handlebar mechanism in the folding mode.

FIGS. 14 and 15 show the folding handlebar mechanism mounted on a folding vehicle. The folding vehicle 9 includes a hinged frame 91, and two wheels 92 respectively mounted at front and rear ends of the hinged frame 91. When the folding vehicle 9 is folded, and the folding handlebar mechanism 1 is in the folding mode, the two wheels 92 and each of the two brake levers 33 are parallel to each other to drastically reduce a distance defined between the two wheels 92 to cause the folding vehicle 9 to be folded into a compact form.

Figure 16:
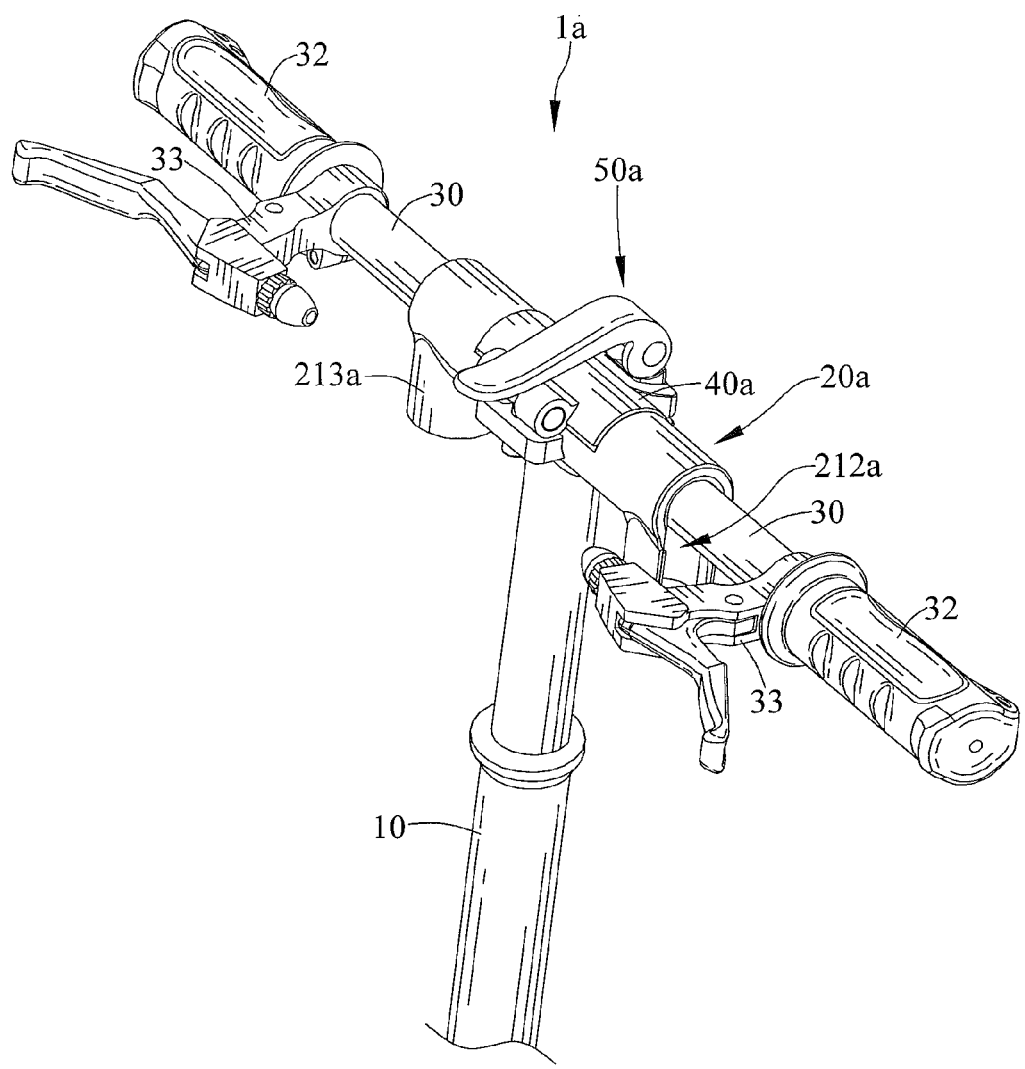
FIG. 16 shows a perspective view of a folding handlebar mechanism of a second embodiment according to the present invention.
Figure 17:
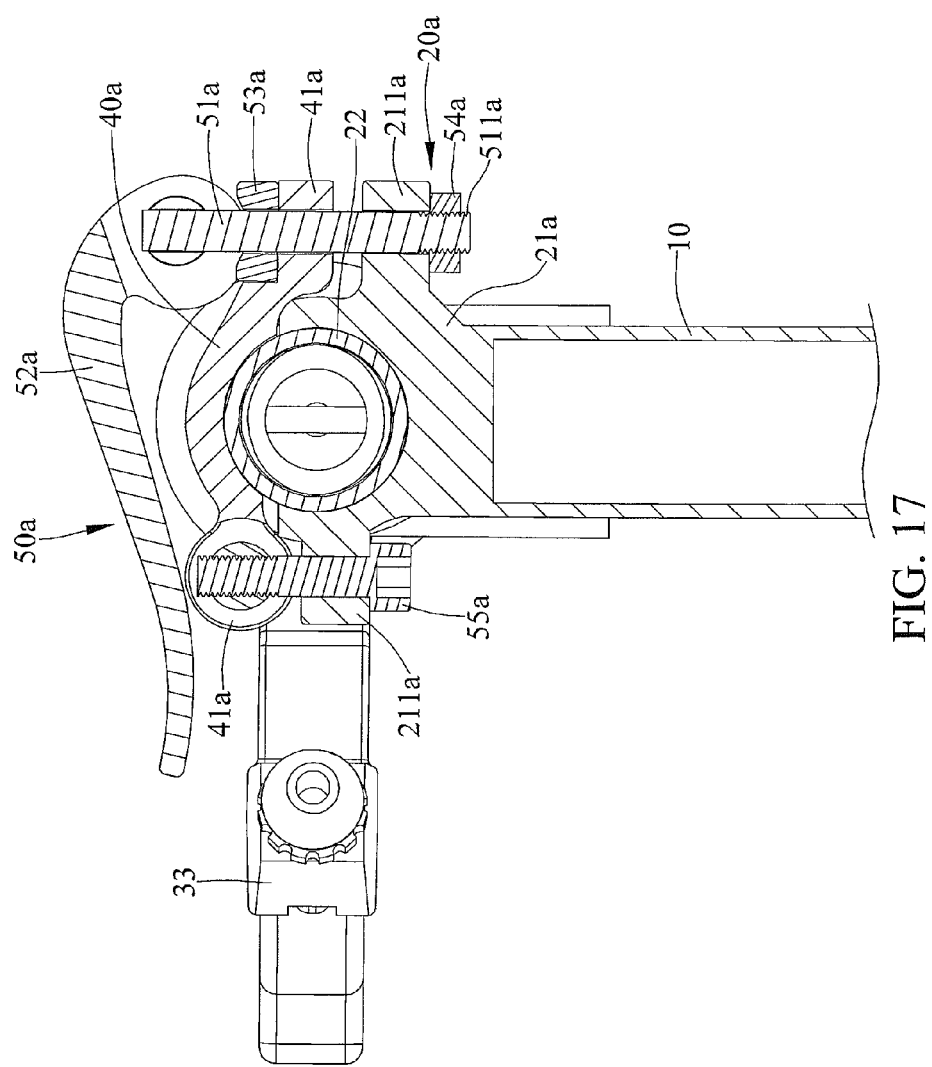
FIG. 17 shows a cross-section view of the folding handlebar mechanism of FIG. 16.

FIGS. 16 and 17 show a second embodiment of the folding handlebar mechanism. Specifically, the folding handlebar mechanism 1a includes the steering tube 10, a stem assembly 20a, the two handlebars 30, a repressed member 40a, and a positioning assembly 50a. However, the structures of the steering tube 10, and the two handlebars 30 are similar to the first embodiment substantially except the stem assembly 20a, the repressed member 40a, the positioning assembly 50a, and the bar holder 60 are removed.

The stem assembly 20a includes an outer sleeve 21a, and the inner sleeve 22 mounted into the outer sleeve 21a. The outer sleeve 21a includes two first linked portions 211a respectively formed at two side sections thereof, two first gaps 212a respectively formed at two distal ends thereof and extended toward a middle part of a bottom section thereof, and two fastening portions 213a respectively extended downward from the bottom section of the two distal ends thereof and connecting with the two first gaps 212a and the two second gaps 222. The two fastening portions 213a are able to engage with the two handlebars 30.

The repressed member 40a includes two second linked portions 41a respectively formed at two side sections thereof and corresponding to the two first linked portions 211a of the outer sleeve 21a.

The positioning assembly 50a is operable between a tighten mode and a loose mode and includes a rod 51a threaded on one end to form a thread portion 511a, a lever 52a pivotally connecting to the other end of the rod 51a, a gasket 53a attached with one of the two second linked portions 41a, a securing member 54a attached with one of the two first linked portions 211a and engaged with the thread portion 511a, and a fastening rod 55a inserting through the other first linked portion 211a and pivotally engaged with the other second linked portions 41a to abut the repressed member 40a against the stem assembly 20a. When the positioning assembly 50a is in the tighten mode, the lever 52a attaches with the gasket 53 to approach one of the two second linked portions 41a to one of the two first linked portions 211a to secure the repressed member 40a to the stem assembly 20a, so that the two handlebars 30 are securely mounted at the two opposite ends of the stem assembly 20a. When the positioning assembly 50a is in the loose mode, the lever 52a detaches from the gasket 53a to cause the two handlebars 30 to be rotatable and slidable with respect to the two opposite ends of the stem assembly 20a.

The folding handlebar mechanism 1, 1a includes the following advantages:

1. Two handlebars 30 are rotatably and slidably mounted at two opposite ends of the stem assembly 20, 20a to cause the folding handlebar mechanism 1, 1a to be operable between an operative mode and a folding mode.

2. When the positioning assembly 50, 50a is in a tighten mode, the lever 52, 52a attaches with the gasket 53, 53a to secure the repressed member 40, 40a to the stem assembly 20, 20a to securely mount the two handlebars 30 at the two opposite ends of the stem assembly 20, 20a. When the positioning assembly 50, 50a is in a loose mode, the lever 52, 52a detaches from the gasket 53, 53a to cause the two handlebars 30 to be rotatable and slidable with respect to the two opposite ends of the stem assembly 20, 20a. Thus, the folding handlebar mechanism 1, 1a is operable between an operative mode and a folding mode simply and quickly.

3. When the folding vehicle 9 is folded, and the folding handlebar mechanism 1, 1a is in the folding mode, the two wheels 92 and each of the two brake levers 33 are parallel to each other to drastically reduce a distance defined between the two wheels 92 to cause the folding vehicle 9 to be folded into a more compact form.

Now that the basic teachings of the folding handlebar mechanism 1, 1a have been explained, many extensions and variations will be obvious to one having ordinary skill in the art. For example, the steering tube 10, the stem assembly 20, 20a, the handlebar 30, the repressed member 40, 40a, the positioning assembly 50, 50a, and the bar holder 60 can have shapes different from those shown in the figures.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A folding handlebar mechanism comprising:
    a steering tube;
    a stem assembly mounted on the steering tube and including a plurality of gaps respectively formed at two distal ends thereof, two bilateral first guiding slots, and two bilateral second guiding slots faced and arranged opposite to the two first guiding slots, wherein the stem assembly includes an outer sleeve and an inner sleeve mounted into the outer sleeve, with the plurality of the gaps including two first gaps and two second gaps, with the outer sleeve including the two first gaps respectively formed at two distal ends thereof, with the inner sleeve including the two second gaps respectively formed at two distal ends thereof and corresponding to the two first gaps of the outer sleeve, the two bilateral first guiding slots, and the two bilateral second guiding slots;
    two handlebars each including an engaging portion and a gripping portion formed at two opposite ends thereof, with the engaging portion rotatably and slidably mounted into one of the two distal ends of the stem assembly and having a guiding hole;
    two guiding pins inserting through the two first guiding slots, the two guiding holes and the two second guiding slots;
    a repressed member abutted against the stem assembly; and
    a positioning assembly operable between a tighten mode and a loose mode and including a rod inserting through the stem assembly and the repressed member;
    wherein the positioning assembly in the tighten mode attaches and presses against the repressed member to secure the repressed member to the stem assembly to securely mount the two handlebars at the two opposite ends of the stem assembly and in the loose mode detaches from and does not press against the repressed member to allow the two handlebars to be rotatable and slidable with respect to the two opposite ends of the stem assembly.

2. The folding handlebar mechanism as claimed in claim 1, wherein each of the two first guiding slots includes a first arc section and a first straight section connected to the first arc section, with each first arc section radially extended from a top section to a side section of the inner sleeve in a circumferential direction, with each first straight section connected to one end of the first arc section disposed at the side section of the inner sleeve and straight extended to the distal end of the side section of the inner sleeve, wherein each of the two second guiding slots includes a second arc section and a second straight section connected to the second arc section, with each second arc section radially extended from a bottom section of the inner sleeve to another side section of the inner sleeve in a circumferential direction, with each second straight section connected to one end of the second arc section disposed at the side section of the inner sleeve and straight extended to the distal end of the inner sleeve.

3. The folding handlebar mechanism as claimed in claim 2, wherein each first arc section is extended in correspondence with each second arc section, with each first straight section extended parallel to each second straight section.

4. The folding handlebar mechanism as claimed in claim 2, wherein the positioning assembly further includes a lever pivotally connecting to an end of the rod, and a gasket attached to the repressed member and abutted against the lever.

5. The folding handlebar mechanism as claimed in claim 4, wherein the outer sleeve includes a content hole formed on a top section thereof, with the inner sleeve including a through hole extended from a top section to a bottom section thereof and connected with the content hole, with the repressed member received in the content hole of the outer sleeve and abutted against the inner sleeve of the stem assembly, with the repressed member including a rectangular engaging groove formed at a top surface thereof and receiving the gasket, and a bore penetrating through the top surface and a bottom surface of the repressed member, with the rod passing through an aperture of the gasket, the bore of the repressed member, the content hole of the outer sleeve, and the through hole of the inner sleeve and connected with the steering tube.

6. The folding handlebar mechanism as claimed in claim 4, wherein the outer sleeve includes two first linked portions respectively formed at two side sections thereof, with the repressed member including two second linked portions respectively formed at two side sections thereof and corresponding to the two first linked portions of the outer sleeve, with the gasket attached with one of the two second linked portions, a securing member attached with one of the two first linked portions and engaged with the first rod, and a fastening rod inserting through the another of the two first linked portions and pivotally engaged with another of the two second linked portions to abut the repressed member against the stem assembly.

7. The folding handlebar mechanism as claimed in claim 4, further comprising a brake lever mounted between the engaging portion and the gripping portion of each of the two handlebars.

8. The folding handlebar mechanism as claimed in claim 7, wherein the folding handlebar mechanism is operable between an operative mode and a folding mode, wherein the folding handlebar mechanism is in the operative mode, with the positioning assembly in the tighten mode, with a cam portion of the lever attaching with an oppression portion of the gasket, with the lever abutting against the outer sleeve to press the repressed member against the inner sleeve, with each of the two guiding pins disposed in the first arc section of each of the two first guiding slots and the second arc section of each of the two second guiding slots, with the two guiding pins being parallel to the rod, with each brake lever and the steering tube formed in a vertical configuration.

9. The folding handlebar mechanism as claimed in claim 8, wherein the lever is pivoted with respect to the rod to operate the positioning assembly from the tighten mode to the loose mode, with the cam portion of the lever detaching from the oppression portion of the gasket, and the lever separated from the outer sleeve, with the repressed member spaced with the inner sleeve, with each of the two handlebars pivoted 90 degrees with respect to the inner sleeve to move each of the two guiding pins from the first arc section of each of the two first guiding slots and the second arc section of each of the two second guiding slots to the first straight section of each of the two first guiding slots and the second straight section of each of the two second guiding slots, with each brake lever and the steering tube formed in a parallel configuration.

10. The folding handlebar mechanism as claimed in claim 9, wherein each of the two handlebars is pulled outward and sliding with respect to the inner sleeve to move each of the two guiding pins from one end of the first straight section adjacent to the first arc section of each of the two first guiding slots and one end of the second straight section adjacent to the second arc section of each of the two second guiding slots to another end of the first straight section adjacent to the second gap of each of the two first guiding slots and another end of the second straight section adjacent to the second gap of each of the two second guiding slots, with each of the two engaging portions exposed from each of the two distal ends of the inner sleeve.

11. The folding handlebar mechanism as claimed in claim 10, wherein each of the two handlebars is pivoted with respect to each of the two guiding pins, with each of the two handlebars received into each of the two first gaps of the outer sleeve and each of the two second gaps of the inner sleeve, with each of the two handlebars being parallel to the steering tube, with each brake lever and the steering tube formed in a parallel configuration, with the positioning assembly in the tighten mode prevent pivoting of the two handlebars with respect to each of the two guiding pins.

12. The folding handlebar mechanism as claimed in claim 1, wherein the outer sleeve further includes two fastening portions respectively extended downward from a bottom section of the two distal ends thereof and connecting with the two first gaps and the two second gaps, with the two fastening portions engaging with the two handlebars.

13. A folding handlebar mechanism comprising:
a steering tube;
a stem assembly mounted on the steering tube and including a plurality of gaps respectively formed at two distal ends thereof, two bilateral first guiding slots, and two bilateral second guiding slots faced and arranged opposite to the two first guiding slots;
two handlebars each including an engaging portion and a gripping portion formed at two opposite ends thereof, with the engaging portion rotatable and slidably mounted into one of the two distal ends of the stem assembly and having a guiding hole;
two guiding pins inserting through the two first guiding slots, the two guiding holes and the two second guiding slots;
a repressed member abutted against the stem assembly;
a positioning assembly operable between a tighten mode and a loose mode and including a rod inserting through the stem assembly and the repressed member; and
a bar holder mounted between the steering tube and the stem assembly, with the bar holder including a vertical hole and two fastening portions formed at two opposite ends thereof, with each of the two fastening portion formed in a C-shaped tube selectively engaging with a corresponding one of the two handlebars;
wherein the positioning assembly in the tighten mode attaches and presses against the repressed member to secure the repressed member to the stem assembly to securely mount the two handlebars at the two opposite ends of the stem assembly and in the loose mode detaches from and does not press against the repressed member to allow the two handlebars to be rotatable and slidable with respect to the two opposite ends of the stem assembly.

14. The folding handlebar mechanism as claimed in claim 13, wherein the stem assembly further includes an extended tube extending downward from a middle part of a bottom section of the outer sleeve, with a terminal end of the extended tube inserting through the vertical hole of the bar holder and engaged with the steering tube.

* * * * *